(12) United States Patent
Peng et al.

(10) Patent No.: US 12,135,661 B2
(45) Date of Patent: Nov. 5, 2024

(54) PROCESSING I/O COMMANDS USING BLOCK SIZE AWARE POLLING

(71) Applicant: Vmware, Inc., Palo Alto, CA (US)

(72) Inventors: Ran Peng, Beijing (CN); Yang Bai, Beijing (CN); Wenchao Cui, Beijing (CN); Yu Zhao, Beijing (CN); Zhihao Yao, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/851,357

(22) Filed: Jun. 28, 2022

(65) Prior Publication Data
US 2023/0367726 A1 Nov. 16, 2023

(51) Int. Cl.
*G06F 13/20* (2006.01)
*G06F 13/24* (2006.01)

(52) U.S. Cl.
CPC ............. *G06F 13/20* (2013.01); *G06F 13/24* (2013.01); *G06F 2213/24* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 7,937,499 B1* | 5/2011 | Tripathi | .................. | H04L 49/90 709/250 |
| 8,433,833 B2* | 4/2013 | Yang | ....................... | G06F 9/545 710/58 |
| 9,817,586 B2* | 11/2017 | Liu | .......................... | G06F 13/22 |
| 11,144,481 B2* | 10/2021 | Adavi | ...................... | G06F 9/546 |
| 2006/0194386 A1* | 8/2006 | Yao | ......................... | G06F 11/201 438/257 |
| 2014/0129751 A1* | 5/2014 | Cho | ........................ | G06F 13/24 710/260 |
| 2017/0242594 A1* | 8/2017 | Liu | ........................ | G06F 3/0659 |
| 2019/0317906 A1* | 10/2019 | Adavi | ..................... | G06F 9/546 |
| 2020/0089527 A1* | 3/2020 | Gavrilov | ................. | G06F 9/546 |

(Continued)

OTHER PUBLICATIONS

'NVM Express Revision 1.2.1' Jun. 5, 2016, copyright NVM Express, Inc. (Year: 2016).*

(Continued)

*Primary Examiner* — Steven G Snyder
(74) *Attorney, Agent, or Firm* — King Intellectual Asset Management (57) ABSTRACT

Example computer-implemented methods, media, and systems for processing input/output (I/O) commands using block size aware polling are disclosed. One example method includes creating multiple polling queues and multiple interrupt queues in a transport drivers layer of a storage stack. A first I/O command is received from a core layer of the storage stack and by the transport drivers layer. A ratio of a total number of multiple small block size commands in the transport drivers layer to a total number of multiple outstanding I/O commands in the transport drivers layer is determined to be larger than a predetermined first threshold. In response to determining that the ratio is larger than the predetermined first threshold, the polling mode is applied to the first I/O command through the submission of the first I/O command to a first polling queue in the multiple polling queues.

20 Claims, 8 Drawing Sheets

(56) References Cited

U.S. PATENT DOCUMENTS

2022/0164302 A1* 5/2022 Eom ................. G06F 13/22
2022/0404980 A1* 12/2022 Brown ............... G06F 3/0659
2022/0414035 A1* 12/2022 Bai .................. G06F 3/0683
2023/0025907 A1* 1/2023 Ravich .............. G06F 13/102

OTHER PUBLICATIONS

Machine Translation of Korean Patent Application KR 102428091 B1, filed 2016. (Year: 2016).*

* cited by examiner

PROCESSING I/O COMMANDS USING BLOCK SIZE AWARE POLLING

CROSS-REFERENCE TO RELATED APPLICATIONS

This application claims priority to International Patent Application No. PCT/CN2022/092210, filed on May 11, 2022, the contents of which is hereby incorporated herein by reference.

BACKGROUND

This specification relates to computer-implemented methods, media, and systems for processing I/O commands using block size aware polling. Non-Volatile Memory Express (NVMe) solid state devices (SSDs) bring rapid performance growth of storage devices. NVMe can allow millions of input/output (I/O) submissions as well as 64 k concurrent submissions per second. The overhead for handling I/O interrupts associated with these submissions can consume significant CPU resources potentially leading to an interrupt storm that results in slowed performance or failure.

Polling is a proactive way for a host to interact with devices and can be used to address interrupt storm. During polling the host can process batches of hardware events and data in different time windows within the same context, thus avoiding context switch. However, polling may be inefficient when I/O commands have varying block sizes. For example, mixed block sizes can be common in multi-tenant computing environments. Due to physical throughput limitations, I/O commands of different block sizes produce different interrupt rates. Polling large block size I/O commands, for example 256 kB, can take more CPU cycles to achieve higher input/output operations per second (IOPs) and lower latency when compared with interruption based processing of the I/O commands.

SUMMARY

This specification describes computer-implemented methods, media, and systems for processing I/O commands using block size aware polling. One example computer-implemented method includes using two queues to process I/O commands separately according to the block sizes of the I/O commands, with one queue processing I/O commands using polling, and the other queue processing I/O commands using interruption. A threshold is used to determine which one of the two queues an I/O command will be submitted to for processing. The threshold can be determined by the ratio of number of I/O commands with small block size to the number of outstanding I/O commands that have not been processed. In some implementations, multiple polling queues and multiple interrupt queues are created in a transport drivers layer of a storage stack, where I/O commands cached in the multiple polling queues are processed using polling mode, I/O commands cached in the multiple interrupt queues are processed using interrupt mode, and a total number of the multiple polling queues equals a total number of the multiple interrupt queues. A first I/O command is received from a core layer of the storage stack and by the transport drivers layer. A ratio of a total number of multiple small block size commands in the transport drivers layer to a total number of multiple outstanding I/O commands in the transport drivers layer is determined to be larger than a predetermined first threshold, where the multiple small block size commands are included in the multiple outstanding I/O commands, and the multiple outstanding I/O commands are received from the core layer of the storage stack and have not been processed by the transport drivers layer. In response to determining that the ratio of the total number of the multiple small block size commands to the total number of the multiple outstanding I/O commands is larger than the predetermined first threshold, the polling mode is applied to the first I/O command through the submission of the first I/O command to a first polling queue in the multiple polling queues.

The subject matter described in this specification can be implemented in particular embodiments so as to realize one or more advantages. When compared with some interruption based schemes for I/O command processing, the advantages include increased throughput of I/O command processing in terms of higher IOPs, reduced CPU consumption in terms of reduced CPU cycles per I/O command (CPIO), and lowered latency of I/O command processing. The I/O commands to be processed can have mixed block sizes, for example, 4 kB to 256 kB. The disclosed subject matter can overcome the regression of CPU consumption observed in some polling based schemes for I/O command processing.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

Because NVMe SSDs can sustain millions of I/O submissions and 64 k concurrent submissions per second, a host can flexibly create multiple queues for submission and completion concurrently. To improve performance of NVMe SSDs, multi-queues can be used for processing I/O commands. Multi-queues can also be used in storage media other than NVMe SSDs for processing of I/O commands.

Polling can be a more efficient way of processing I/O commands with small block sizes than interruption, because I/O commands with small block sizes are more likely to cause Interrupt Storm than I/O commands with large block sizes. Multi-queues and polling methods can be combined to improve the storage performance such as IOPs when processing I/O commands with mixed block sizes.

This specification describes technologies for processing I/O commands received by a drivers layer of a storage stack, based on the block size characteristics of the received I/O commands and without any modification of other layers of the storage stack, except for the drivers layer. The described technologies can improve the storage performance by processing I/O commands with different block sizes using a combination of polling and interruption, without increasing, and in some cases decreasing, CPU consumption. In some implementations, two types of I/O queues, i.e., polling queues for polling mode based processing of the received I/O commands and interrupt queues for interrupt mode based processing of the received I/O commands, are set up in the drivers layer to replace the original queues in the drivers layer. The received I/O commands are processed separately, e.g., assigned to different queues, based on their respective block sizes. Furthermore, a threshold can be used to determine whether to submit a received I/O command to a polling queue or an interrupt queue for processing. The threshold can also help to extend the compatibility of resource-limited storage devices, where the number of hardware queues may not be enough for the drivers layer to set up both the polling queues and the interrupt queues.

Figure 1:
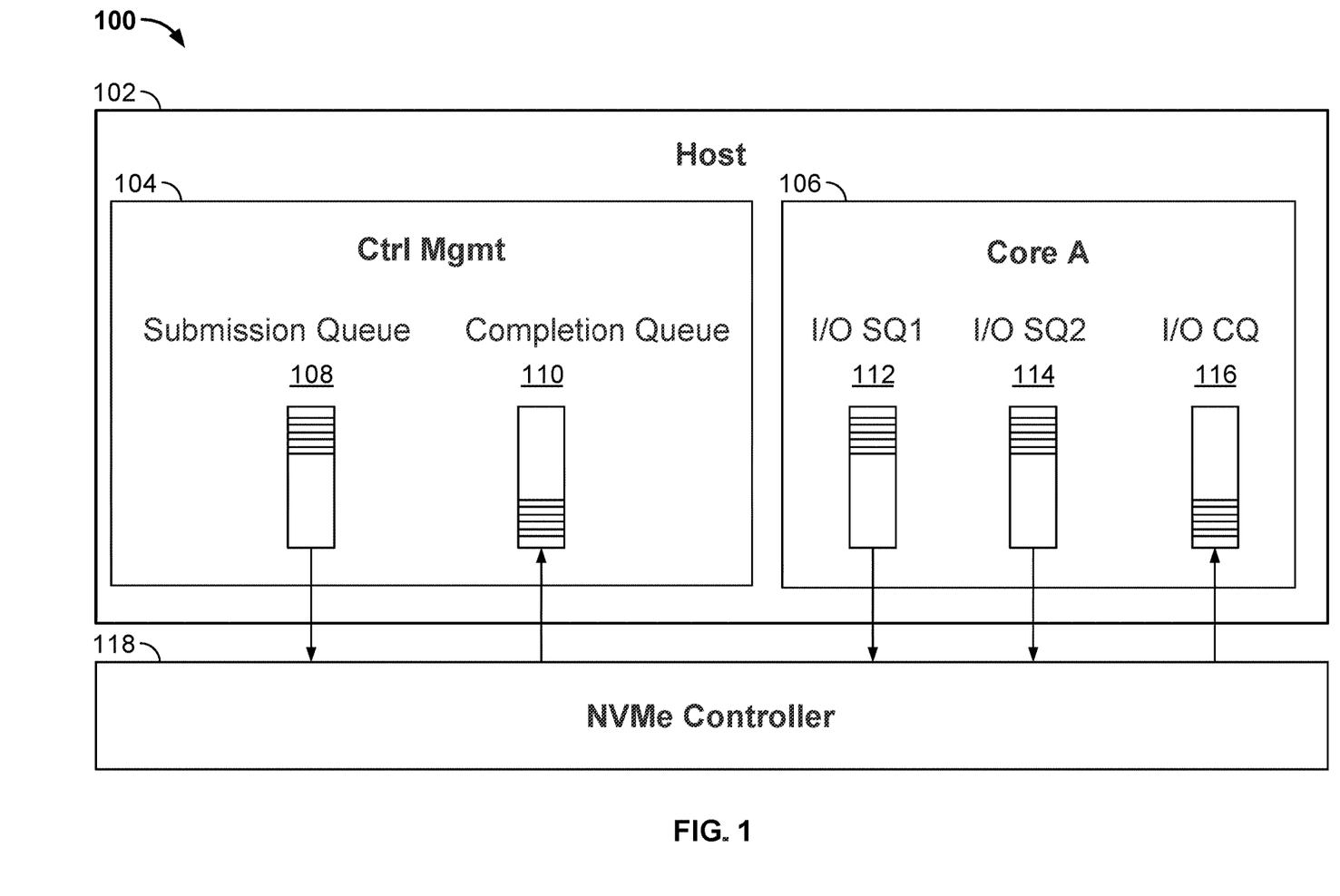
FIG. 1 is a schematic illustration of an example multi-queues system for NVMe commands submission and completion.

FIG. 1 is a schematic illustration of an example multi-queues system 100 for NVMe commands submission and completion, in accordance with example implementations of this disclosure.

In some implementations, host software from host 102 can create queues, up to the maximum number of queues supported by the NVMe controller 118. The number of command queues created can be based on the system configuration and anticipated workload. For example, on a four core processor based system, there can be a queue pair per core to avoid locking and ensure that data structures are created in the appropriate processor core's cache. FIG. 1 illustrates an example of a graphical representation of the queue pair mechanism, showing a n:1 mapping between I/O submission queues, for example, I/O SQ 1 112 and I/O SQ2 114, and completion queues, for example, I/O CQ 116, with n=2 in FIG. 1. In some implementations, there can be 1:1 mapping between I/O submission queues and completion queues, but there is always a 1:1 mapping between the admin submission queue 108 and admin completion queue 110. An admin queue can be used to process SSDs management related commands.

In some implementations, a submission queue (SQ), for example, I/O SQ1 112, can be a circular buffer with a fixed slot size that the host software uses to submit commands for execution by the NVMe controller 118. The host software can update the SQ tail doorbell register when there are one to n new commands to execute. The previous SQ tail value can be overwritten in the NVMe controller 118 when there is a new doorbell register write. The NVMe controller 118 can fetch SQ entries in order from the submission queue 108 and may execute those commands in any order.

In some implementations, completion queue (CQ) 110 can be a circular buffer with a fixed slot size used to post status for completed commands. A completed command can be uniquely identified by a combination of the associated SQ identifier and command identifier that is assigned by host software. Multiple submission queues can be associated with a single completion queue. This feature can be used where a single worker thread processes all command completions via one completion queue even when those commands originated from multiple submission queues. The CQ head pointer can be updated by host software after processing completion queue entries indicating the last free CQ slot.

In some implementations, NVMe SSDs can sustain millions of I/O requests and 64 k concurrent requests per second, and therefore the host 102 can flexibly create multiple queues for submission and completion concurrently. To improve performance of NVMe SSDs, various platforms support multi-queues for processing I/O requests.

Figure 2:
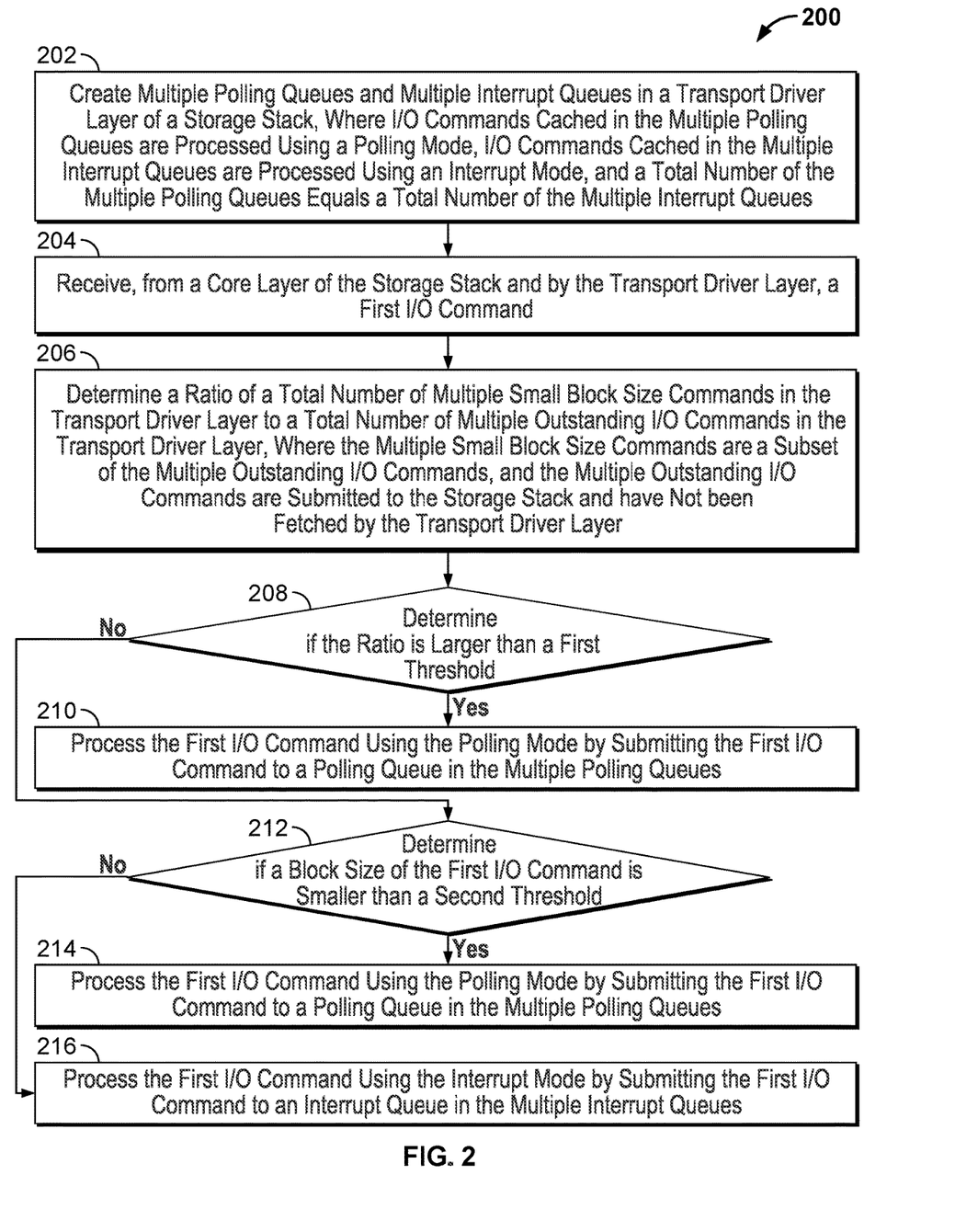
FIG. 2 is a flowchart illustrating an example method for block size aware polling.

FIG. 2 illustrates an example method 200 for block size aware polling, in accordance with example implementations of this disclosure. For convenience, the method 200 will be described as being performed by a system of one or more computers, located in one or more locations, and programmed appropriately in accordance with this specification. For example, a multi-queues system, e.g., the multi-queues system 100 of FIG. 1, appropriately programmed, can perform the method 200.

At 202, the system creates multiple polling queues and multiple interrupt queues in a transport drivers layer of a storage stack, where I/O commands cached in the multiple polling queues are processed using polling mode, I/O commands cached in the multiple interrupt queues are processed using interrupt mode, and a total number of the multiple polling queues equals a total number of the multiple interrupt queues.

At 204, the transport drivers layer receives, from a core layer of the storage stack, a first I/O command.

At 206, the system determines a ratio of a total number of multiple small block size commands in the transport drivers layer to a total number of multiple outstanding I/O commands in the transport drivers layer. The multiple small block size commands are included in the count of the multiple outstanding I/O commands, and the multiple outstanding I/O commands are received from the core layer of the storage stack and have not been processed by the transport drivers layer.

At 208, the system determines if the ratio is larger than a first threshold.

At 210, in response to determining that the ratio is larger than the first threshold, the system applies the polling mode to the first I/O command by submitting the first I/O command to a polling queue in the multiple polling queues.

At 212, in response to determining that the ratio is not larger than the first threshold, the system determines if a block size of the first I/O command is smaller than a second threshold.

At 214, in response to determining that the block size of the first I/O command is smaller than a second threshold, the system applies the polling mode to the first I/O command by submitting the first I/O command to a polling queue in the multiple polling queues.

At 216, in response to determining that the block size of the first I/O command is not smaller than a second threshold, the system applies the interrupt mode to the first I/O command by submitting the first I/O command to an interrupt queue in the multiple interrupt queues.

Some example methods are described next.

In some implementations, the layers in a storage stack can include a FDS (Filesystem Device Switch) layer, a PSA (Pluggable Storage Architecture) layer, a NVMe core layer, a NVMe transport drivers layer, and a NVMe devices layer. The I/O commands can be submitted from one layer to an adjacent lower layer. Every layer can cache received I/O commands using its multi-queues and can hold the submission callback and queues information exposed by the adjacent lower layer. The queues information exposed by the adjacent lower layer can include the number, depth, and capacity of queues in the adjacent lower layer.

In some implementations, without any modification of other layers, the NVMe transport drivers layer sets up an equal number of polling queues and interrupt queues, but only exposes the number of polling queues or the number of interrupt queues to the NVMe core layer. Therefore the number of total queues in the NVMe core layer is half the number of total queues in the NVMe transport drivers layer.

Figure 3:
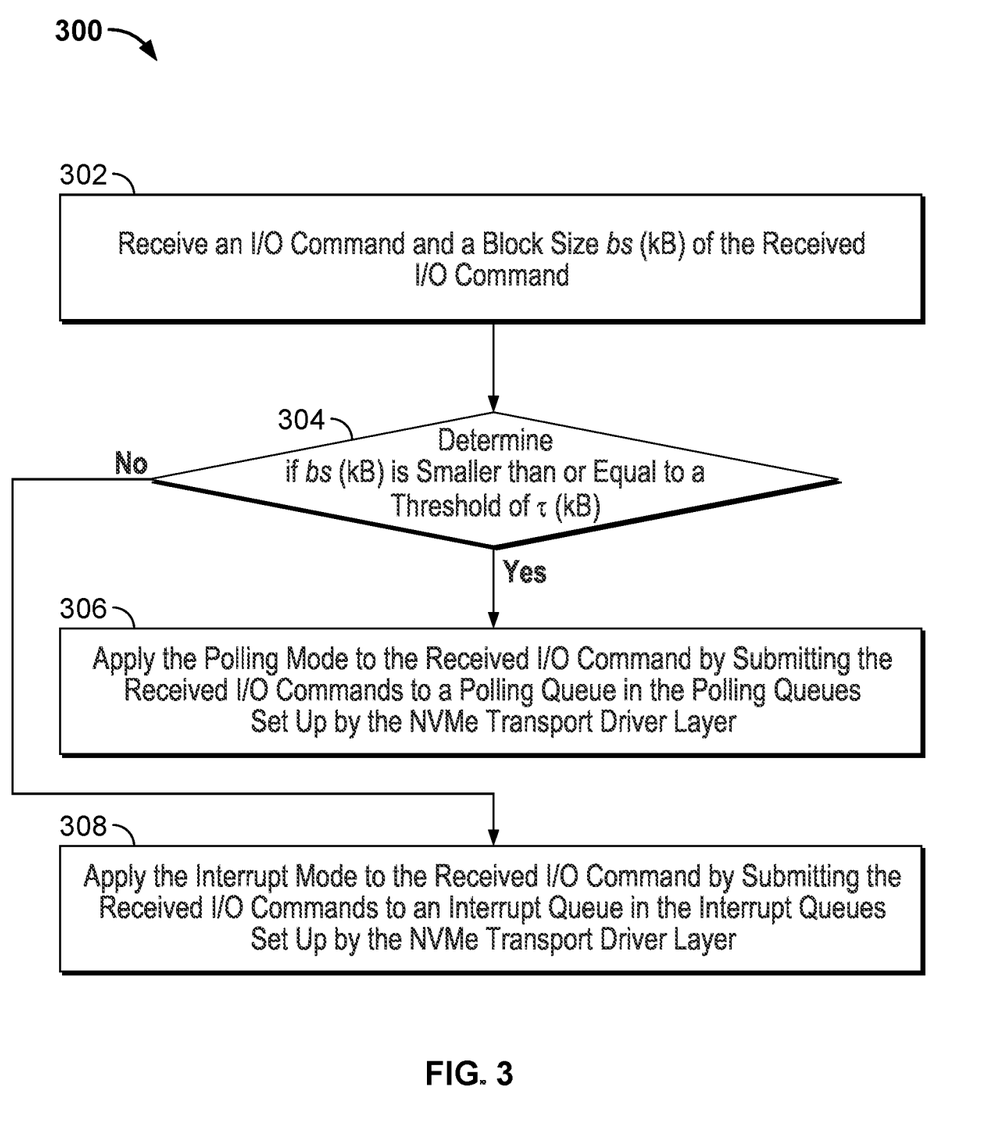
FIG. 3 is a flowchart illustrating an example method that uses both the polling queues and the interrupt queues set up by the NVMe transport drivers layer to process received I/O commands by their block sizes.

FIG. 3 illustrates an example method 300 that uses both the polling queues and the interrupt queues set up by the NVMe transport drivers layer to process received I/O commands by their block sizes. For convenience, the method 300 will be described as being performed by a system of one or more computers, located in one or more locations, and programmed appropriately in accordance with this specification. For example, a multi-queues system, e.g., the multi-queues system 100 of FIG. 1, appropriately programmed, can perform the method 300.

At 302, when the NVMe transport drivers layer of a storage stack receives an I/O command from the NVMe core layer of the storage stack, the system receives, as part of the input to the method 300, a block size bs (kB) of the received I/O command.

At 304, the system determines if the block size bs (kB) of the received I/O command is smaller than or equal to a threshold of τ (kB).

At 306, in response to determining that the block size bs (kB) of the received I/O command is smaller than or equal to the threshold of block size τ (kB), the system applies the polling mode to the received I/O command by submitting the received I/O command to a polling queue in the polling queues set up by the NVMe transport drivers layer.

At 308, in response to determining that the block size bs (kB) of the received I/O command is larger than the threshold of block size τ (kB), the system applies the interrupt mode to the received I/O command by submitting the received I/O command to an interrupt queue in the interrupt queues set up by the NVMe transport drivers layer.

The method 300 can be illustrated as follows.

| Algorithm 1: Dispatching NVMe commands by block size with two queues | |
|---|---|
| | Input: cmd, bs, intrQueue, pollQueue |
| 1 | Function SubmitNVMeCmd( ) |
| 2 |    if bs ≤ τ then |
| 3 |       submitToHarwareQueue(cmd, pollQueue) |
| 4 |    else |
| 5 |       submitToHarwareQueue(cmd, intrQueue) |
| 6 |    end |
| 7 | end |

In some implementations, there may not be enough queues available for the NVMe transport drivers layer to set up an equal number of polling queues and interrupt queues. Without increasing the CPU consumption, a metric can be determined as to when to switch between the polling mode and the interrupt mode for processing a received I/O command. In some implementations, the metric can be chosen to be a ratio of the total number of the small block size commands in the NVMe transport drivers layer to the total number of outstanding I/O commands in the NVMe transport drivers layer. The outstanding I/O commands are received from the NVMe core layer of the storage stack and have not been processed by the NVMe transport drivers layer.

Figure 4:
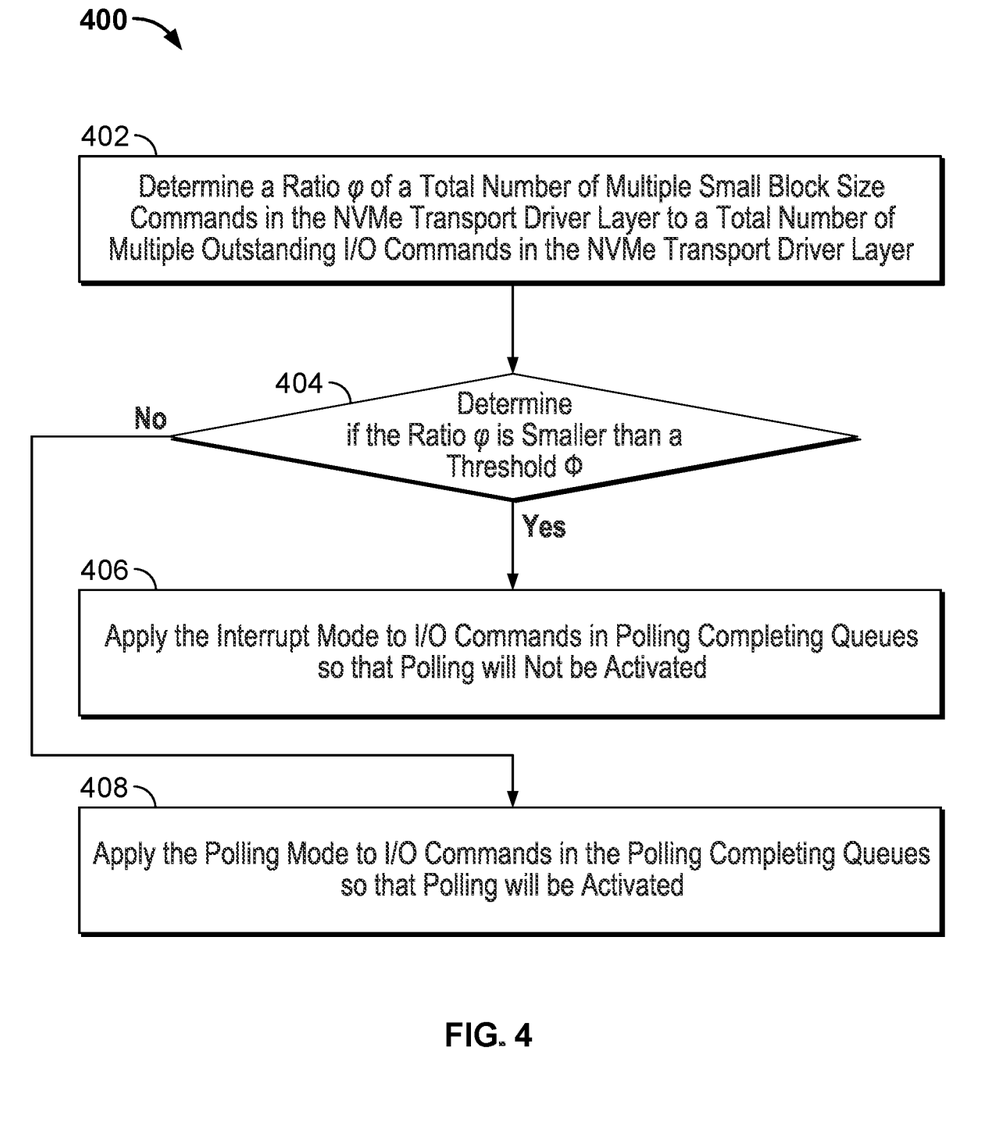
FIG. 4 is a flowchart illustrating an example method that uses a ratio of the total number of the small block size I/O commands to the total number of outstanding I/O commands in the NVMe transport drivers layer to determine when to switch between the polling mode and the interrupt mode for processing a received I/O command.

FIG. 4 illustrates an example method 400 that uses a ratio of the total number of the small block size I/O commands to the total number of outstanding I/O commands in the NVMe transport drivers layer to determine when to switch between the polling mode and the interrupt mode for processing a received I/O command. For convenience, the method 400 will be described as being performed by a system of one or more computers, located in one or more locations, and programmed appropriately in accordance with this specification.

At 402, when the NVMe transport drivers layer of a storage stack receives an I/O command from the NVMe core layer of the storage stack, the system determines a ratio $\varphi$ of a total number of multiple small block size commands in the NVMe transport drivers layer to a total number of multiple outstanding I/O commands in the NVMe transport drivers layer. The multiple small block size commands are included in the count of the multiple outstanding I/O commands, and the multiple outstanding I/O commands are received from the NVMe core layer of the storage stack and have not been processed by the NVMe transport drivers layer.

At 404, the system determines if the ratio $\varphi$ is smaller than a threshold $\Phi$. In some implementations, the value of the threshold $\Phi$ can be determined by testing different I/O commands of mixed block sizes. For example, $\Phi$ can be selected from a set of values, depending on the respective storage performance resulted from each $\Phi$ value in the set.

At 406, in response to determining that the ratio $\varphi$ is smaller than the threshold $\Phi$, the system applies the interrupt mode to the received I/O command.

At 408, in response to determining that the ratio $\varphi$ is equal to or larger than the threshold $\Phi$, the system applies the polling mode to the received I/O command.

The method 400 can be illustrated as follows.

| Algorithm 2: Switch polling with threshold $\Phi$ | |
|---|---|
| | Input: cmd, pollhandler |
| 1 | Function IntrHandler( ) |
| 2 |    if $\varphi < \Phi$ then |
| 3 |       completeNVMeCmd(cmd) |
| 4 |    else |
| 5 |       activatePollRoutine(pollhandler) |
| 6 |    end |
| 7 | end |

In some implementations, even if the NVMe transport drivers layer has enough queues to process different block size commands separately using either the polling queues or the interrupt queues, more CPU cycles may be needed to process I/O commands using the polling queues and the interrupt queues, when compared with interrupt mode based processing. Therefore the method 300 and the method 400 can be combined as a block size aware polling method, as described below.

Figure 5:
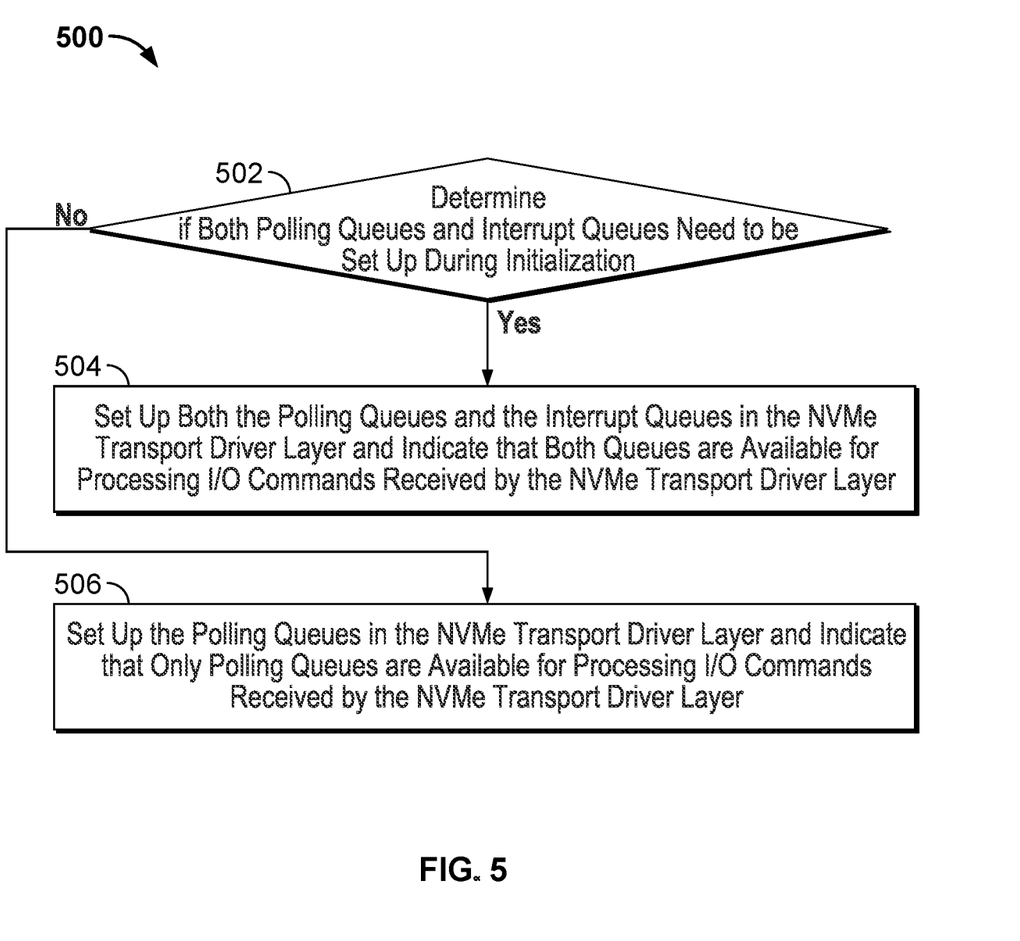
FIG. 5 is a flowchart illustrating an example method that initializes a method that combines the methods illustrated in FIGS. 3 and 4 to process received I/O commands by their block sizes.

FIG. 5 illustrates an example method 500 that initializes a method that combines the methods 300 and 400 to process received I/O commands by their block sizes. For convenience, the method 500 will be described as being performed by a system of one or more computers, located in one or more locations, and programmed appropriately in accordance with this specification. For example, a multi-queues system, e.g., the multi-queues system 100 of FIG. 1, appropriately programmed, can perform the method 500.

At 502, the system determines if both polling queues and interrupt queues need to be set up in the NVMe transport drivers layer of a storage stack during initialization.

At 504, in response to determining that both polling queues and interrupt queues need to be set up, the system sets up both the polling queues and the interrupt queues in the NVMe transport drivers layer, and indicates that both queues are available for processing I/O commands received by the NVMe transport drivers layer.

At 506, in response to determining that the NVMe transport drivers layer does not need to set up both polling queues and interrupt queues, the system sets up the polling queues in the NVMe transport drivers layer, and indicates that only polling queues are available for processing I/O commands received by the NVMe transport drivers layer.

Figure 6:
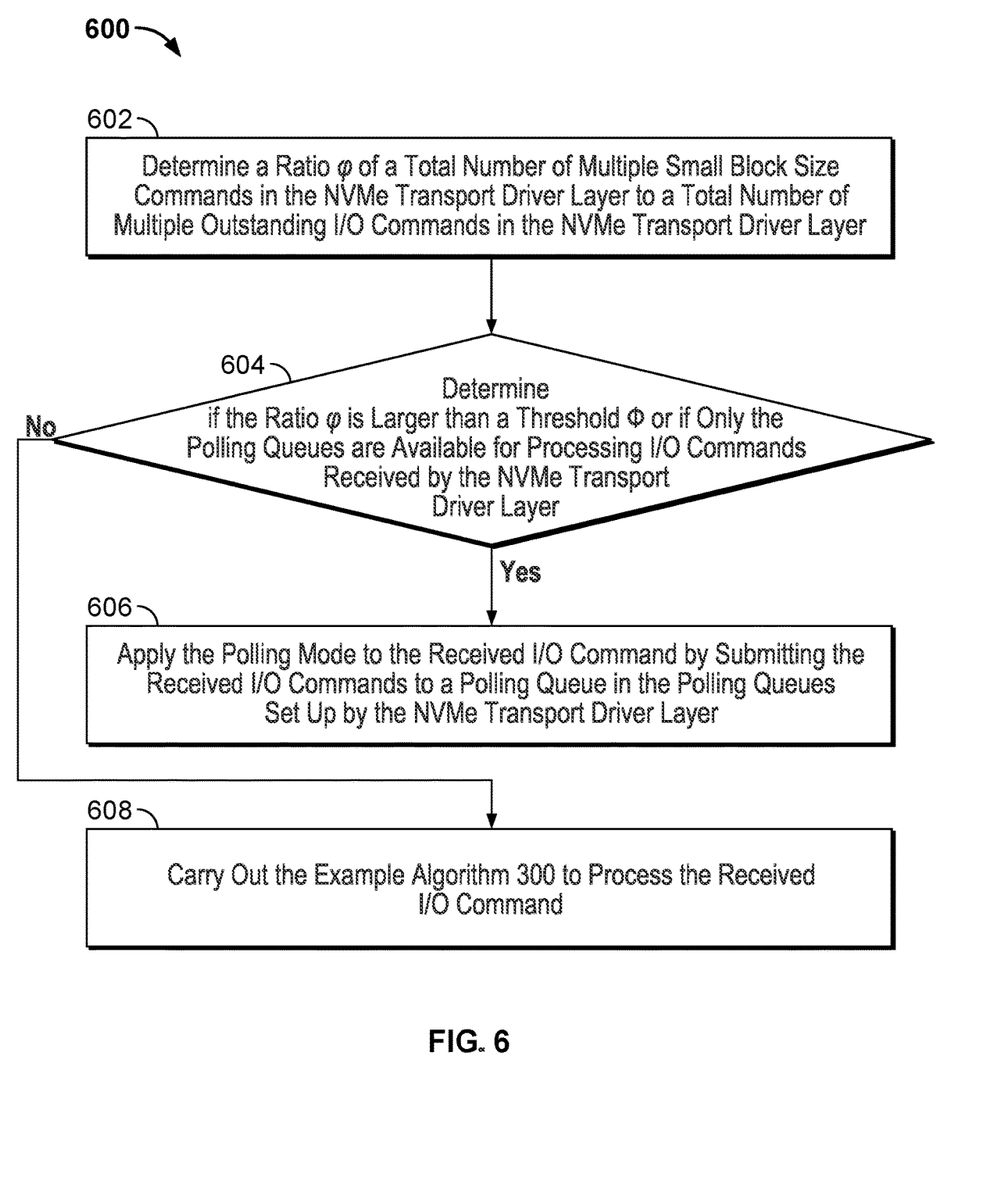
FIG. 6 is a flowchart illustrating an example method that combines the methods illustrated in FIGS. 3 and 4 to process received I/O commands by their block sizes, after the example method illustrated in FIG. 5 is carried out.

FIG. 6 illustrates an example method 600 that combines the methods 300 and 400 to process received I/O commands by their block sizes, after the example method 500 is carried out. For convenience, the method 600 will be described as being performed by a system of one or more computers, located in one or more locations, and programmed appropriately in accordance with this specification. For example, a multi-queues system, e.g., the multi-queues system 100 of FIG. 1, appropriately programmed, can perform the method 600.

At 602, when the NVMe transport drivers layer of a storage stack receives an I/O command from the NVMe core layer of the storage stack, the system determines a ratio $\varphi$ of a total number of multiple small block size commands in the NVMe transport drivers layer to a total number of multiple outstanding I/O commands in the NVMe transport drivers layer. The multiple small block size commands are included in the count of the multiple outstanding I/O commands, and the multiple outstanding I/O commands are received from the NVMe core layer of the storage stack and have not been processed by the NVMe transport drivers layer.

At 604, the system determines if the ratio $\varphi$ is larger than a threshold 4:1) or if only the polling queues are available for processing I/O commands received by the NVMe transport drivers layer.

At 606, in response to determining that the ratio $\varphi$ is larger than the threshold $\Phi$ or only the polling queues are available for processing I/O commands received by the NVMe transport drivers layer, the system applies the polling mode to the received I/O command by submitting the received I/O command to a polling queue in the polling queues set up by the NVMe transport drivers layer.

At 608, in response to determining that the ratio $\varphi$ is equal to or smaller than the threshold 1 and both the polling queues and the interrupt queues are available for processing I/O commands received by the NVMe transport drivers layer, the system carries out the example method 300 to process the received I/O command.

Figure 7:
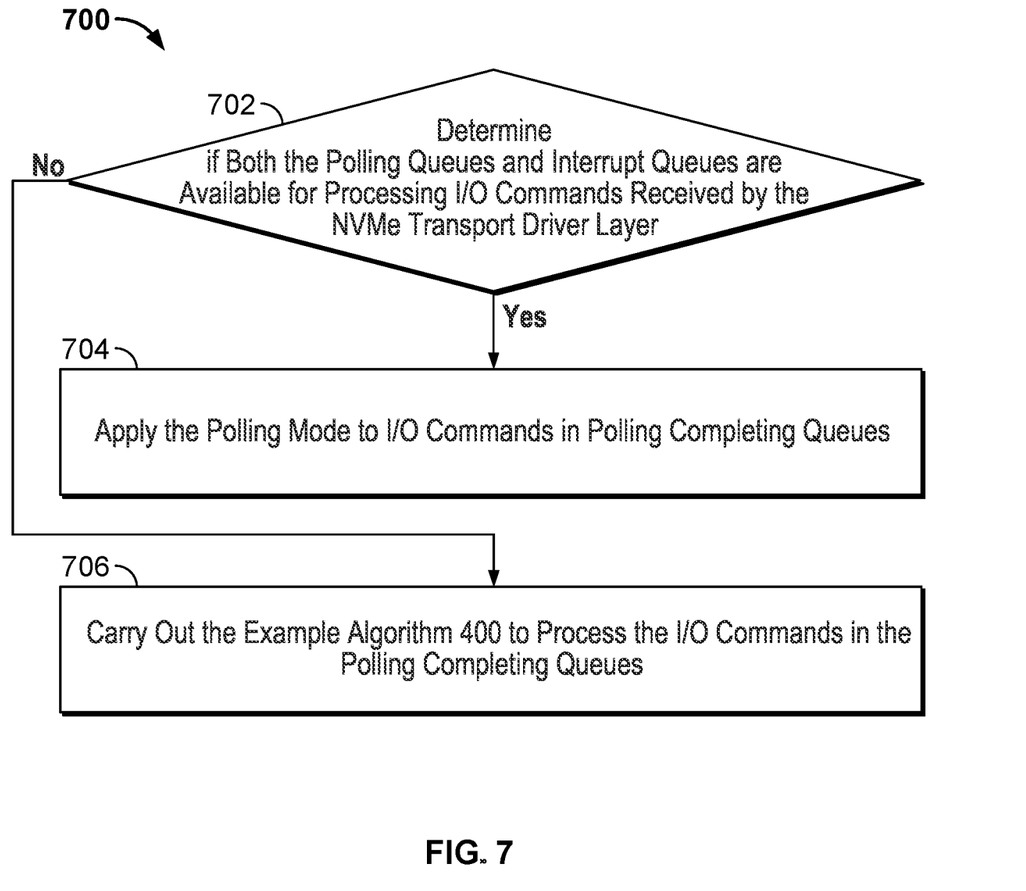
FIG. 7 is a flowchart illustrating an example method for the interrupt handler of the polling queues in the NVMe transport drivers layer, after the example method illustrated in FIG. 5 is carried out.

FIG. 7 illustrates an example method 700 for the interrupt handler of the polling queues in the NVMe transport drivers layer, after the example method 500 is carried out. For convenience, the method 700 will be described as being performed by a system of one or more computers, located in one or more locations, and programmed appropriately in accordance with this specification.

At 702, the system determines if both the polling queues and the interrupt queues are available for processing I/O commands received by the NVMe transport drivers layer.

At 704, in response to determining that both the polling queues and the interrupt queues are available for processing I/O commands received by the NVMe transport drivers layer, the system applies the polling mode to the received I/O commands submitted to the polling queues.

At 706, in response to determining that only the polling queues are available for processing I/O commands received by the NVMe transport drivers layer, the system carries out the example method 400 to process the received I/O commands.

For the interrupt handler of the interrupt queues in the NVMe transport drivers layer, the I/O commands are completed directly.

A combination of methods 500, 600, and 700 can be illustrated as follows.

---

Algorithm 3: Block Size Aware Polling

---

```
   parameter:TwoQueuesEnabled
1  Function Initialization( )
2  |  if setUpTwiceQueuesThanDefault( ) then
3  |  |  TwoQueuesEnabled = TRUE
4  |  |  set up intr queues
5  |  |  set up poll queues
6  |  else
7  |  |  TwoQueuesEnabled = FALSE
8  |  |  set up poll queues
9  |  end
10 end
   Input: cmd, bs, intrQueue, pollQueue
11 Function SubmitNVMeCmd( )
12 |  if φ > Φ or !TwoQueuesEnabled then
13 |  |  submitToHarwareQueue(cmd, PollQueue)
14 |  else
15 |  |  act as Alg.1
16 |  end
17 end
   Input: cmd, pollhandler
18 Function IntrHandlerPollQueue( )
19 |  if TwoQueuesEnabled then
20 |  |  activatePollRoutine(pollhandler)
21 |  else
22 |  |  act as Alg.2
23 |  end
24 end
```

---

Figure 8:
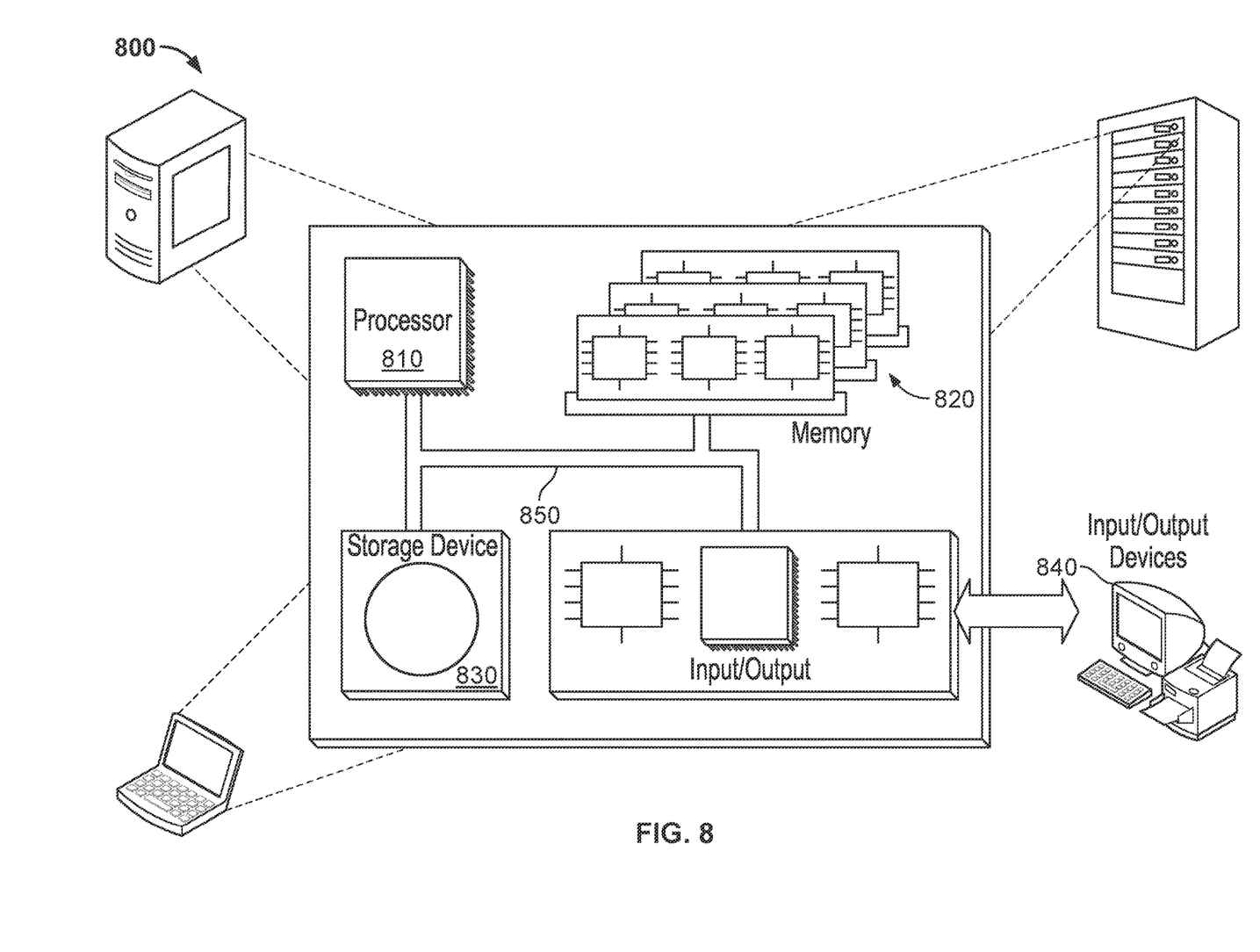
FIG. 8 is a schematic illustration of example computer systems that can be used to execute implementations of the present disclosure.

FIG. 8 illustrates a schematic diagram of an example computing system 800. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, and 840 are interconnected using a system bus 850. The processor 810 is capable of processing instructions for execution within the system 800. In some implementations, the processor 810 is a singlethreaded processor. The processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit. The memory 820 is a non-volatile memory unit. The storage device 830 is capable of providing mass storage for the system 800. The storage device 830 is a computer-readable medium. The storage device 830 may be a floppy disk device, a hard disk device, an optical disk device, or a tape device. The input/output device 840 provides input/output operations for the system 800. The input/output device 840 includes a keyboard and/or pointing device. The input/output device 840 includes a display unit for displaying graphical user interfaces.

Certain aspects of the subject matter described here can be implemented as a method. Multiple polling queues and multiple interrupt queues are created in a transport drivers layer of a storage stack, where input/output (I/O) commands cached in the multiple polling queues are processed using polling mode, I/O commands cached in the multiple interrupt queues are processed using interrupt mode, and a total number of the multiple polling queues equals a total number of the multiple interrupt queues. A first I/O command is received from a core layer of the storage stack and by the transport drivers layer. A ratio of a total number of multiple small block size commands in the transport drivers layer to a total number of multiple outstanding I/O commands in the transport drivers layer is determined to be larger than a predetermined first threshold, where the multiple small block size commands are comprised in the multiple outstanding I/O commands, and where the multiple outstanding I/O commands are received from the core layer of the storage stack and have not been processed by the transport drivers layer. In response to determining that the ratio of the total number of the multiple small block size commands to the total number of the multiple outstanding I/O commands is larger than the predetermined first threshold, the polling mode is applied to the first I/O command by submitting the first I/O command to a first polling queue in the multiple polling queues.

An aspect taken alone or combinable with any other aspect includes the following features. A second I/O command is received from the core layer of the storage stack and by the transport drivers layer. The ratio of the total number of the multiple small block size commands in the transport drivers layer to the total number of the multiple outstanding I/O commands in the transport drivers layer is determined to be the same as or smaller than a predetermined second threshold. In response to determining that the ratio of the total number of the multiple small block size commands to the total number of the multiple outstanding I/O commands is the same as or smaller than the predetermined second threshold, a block size of the second I/O command is determined to be smaller than a predetermined third threshold. In response to determining that the block size of the second I/O command is smaller than the predetermined third threshold, the second I/O command is submitted to a second polling queue in the multiple polling queues for the polling mode to be applied to the second I/O command.

An aspect taken alone or combinable with any other aspect includes the following features. A third I/O command is received from the core layer of the storage stack and by the transport drivers layer. The ratio of the total number of the multiple small block size commands in the transport drivers layer to the total number of the multiple outstanding I/O commands in the transport drivers layer is determined to be the same as or smaller than the predetermined first threshold. In response to determining that the ratio of the total number of the multiple small block size commands to the total number of the multiple outstanding I/O commands is the same as or smaller than the predetermined first threshold, a block size of the third I/O command is determined to be larger than the predetermined third threshold. In response to determining that the block size of the third I/O command is larger than the predetermined third threshold, the interrupt mode is applied to the third I/O command by submitting the third I/O command to an interrupt queue in the multiple interrupt queues.

An aspect taken alone or combinable with any other aspect includes the following features. The transport drivers layer exposes the total number of the multiple polling queues or the total number of the multiple interrupt queues to the core layer.

An aspect taken alone or combinable with any other aspect includes the following features. The storage stack further includes at least one of a filesystem device switch (FDS) layer, a pluggable storage architecture (PSA) layer, or a devices layer.

An aspect taken alone or combinable with any other aspect includes the following features. A respective interrupt handler of each polling queue in the multiple polling queues applies the polling mode to I/O commands submitted to each polling queue.

An aspect taken alone or combinable with any other aspect includes the following features. A respective block size of each of the multiple small block size commands is smaller than a predetermined fourth threshold.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a computer-implemented system that includes one or more processors including a hardware-based processor, and a memory storage including a non-transitory computer-readable medium storing instructions which, when executed by the one or more processors performs operations including the methods described here.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method, comprising:
   creating, in a transport driver layer of a storage stack, a plurality of polling queues that process cached input/output (I/O) commands using a polling mode and a plurality of interrupt queues that process cached I/O commands in an interrupt mode;
   receiving, from a core layer of the storage stack and by the transport driver layer, a plurality of I/O commands, the plurality of I/O commands comprising a first I/O command;
   identifying a first value representing a total amount of unprocessed I/O commands in the transport driver layer;
   identifying a second value representing an amount of unprocessed I/O commands in the transport driver layer with block sizes below a first threshold size;
   calculating a ratio of the second value to the first value; and
   if the ratio is larger than a threshold ratio, submitting the first I/O command to one of the plurality of polling queues; and
   if the ratio is not larger than the threshold ratio:
     determining a block size of the first I/O command;
     if the block size of the first I/O command is not larger than a second threshold size, submitting the first I/O command to one of the plurality of polling queues; and
     if the block size of the first I/O command is larger than the second threshold size, submitting the first I/O command to one of the interrupt queues.

2. The computer-implemented method according to claim 1, further comprising:
   establishing the plurality of polling queues; and
   establishing the plurality of interrupt queues;
   wherein the plurality of polling queues and the plurality of interrupt queues each consists of a same number of queues.

3. The computer-implemented method according to claim 1, further comprising:
   testing storage performance of a plurality of ratios by performing a plurality of I/O commands with mixed block sizes;
   determining the threshold ratio from the plurality of possible ratios based on the storage performance.

4. The computer-implemented method according to claim 1, wherein the transport driver layer exposes at least one of the total number of the plurality of polling queues or the total number of the plurality of interrupt queues to the core layer.

5. The computer-implemented method according to claim 1, wherein the storage stack further comprises at least one of a filesystem device switch (FDS) layer, a pluggable storage architecture (PSA) layer, or a devices layer.

6. The computer-implemented method according to claim 1, wherein a respective interrupt handler of each polling queue in the plurality of polling queues applies the polling mode to I/O commands submitted to each polling queue.

7. The computer-implemented method according to claim 1, wherein the first threshold size is equal to the second threshold size.

8. A non-transitory, computer-readable medium storing one or more instructions executable by a computer system to perform operations, the operations comprising:
creating, in a transport driver layer of a storage stack, a plurality of polling queues that process cached input/output (I/O) commands using a polling mode and a plurality of interrupt queues that process cached I/O commands in an interrupt mode;
receiving, from a core layer of the storage stack and by the transport driver layer, a plurality of I/O commands, the plurality of I/O commands comprising a first I/O command;
identifying a first value representing a total amount of unprocessed I/O commands in the transport driver layer;
identifying a second value representing an amount of unprocessed I/O commands in the transport driver layer with block sizes below a first threshold size;
calculating a ratio of the second value to the first value; and
if the ratio is larger than a threshold ratio, submitting the first I/O command to one of the plurality of polling queues; and
if the ratio is not larger than the threshold ratio:
determining a block size of the first I/O command;
if the block size of the first I/O command is not larger than a second threshold size, submitting the first I/O command to one of the plurality of polling queues; and
if the block size of the first I/O command is larger than the second threshold size, submitting the first I/O command to one of the interrupt queues.

9. The non-transitory, computer-readable medium according to claim 8, wherein the operations further comprise:
establishing the plurality of polling queues; and
establishing the plurality of interrupt queues;
wherein the plurality of polling queues and the plurality of interrupt queues each consists of a same number of queues.

10. The non-transitory, computer-readable medium according to claim 8, wherein the operations further comprise:
testing storage performance of a plurality of ratios by performing a plurality of I/O commands with mixed block sizes;
determining the threshold ratio from the plurality of possible ratios based on the storage performance.

11. The non-transitory, computer-readable medium according to claim 8, wherein the transport driver layer exposes at least one of the total number of the plurality of polling queues or the total number of the plurality of interrupt queues to the core layer.

12. The non-transitory, computer-readable medium according to claim 8, wherein the storage stack further comprises at least one of a filesystem device switch (FDS) layer, a pluggable storage architecture (PSA) layer, or a devices layer.

13. The non-transitory, computer-readable medium according to claim 8, wherein a respective interrupt handler of each polling queue in the plurality of polling queues applies the polling mode to I/O commands submitted to each polling queue.

14. The non-transitory, computer-readable medium according to claim 8, wherein the first size threshold is equal to the second threshold size.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations, the one or more operations comprising:
creating, in a transport driver layer of a storage stack, a plurality of polling queues that process cached input/output (I/O) commands using a polling mode and a plurality of interrupt queues that process cached I/O commands in an interrupt mode;
receiving, from a core layer of the storage stack and by the transport driver layer, a plurality of I/O commands, the plurality of I/O commands comprising a first I/O command;
identifying a first value representing a total amount of unprocessed I/O commands in the transport driver layer;
identifying a second value representing an amount of unprocessed I/O commands in the transport driver layer with block sizes below a first threshold size;
calculating a ratio of the second value to the first value; and
if the ratio is larger than a threshold ratio, submitting the first I/O command to one of the plurality of polling queues; and
if the ratio is not larger than the threshold ratio:
determining a block size of the first I/O command;
if the block size of the first I/O command is not larger than a second threshold size, submitting the first I/O command to one of the plurality of polling queues; and
if the block size of the first I/O command is larger than the second threshold size, submitting the first I/O command to one of the interrupt queues.

16. The computer-implemented system according to claim 15, wherein the one or more operations further comprise:
establishing the plurality of polling queues; and
establishing the plurality of interrupt queues;
wherein the plurality of polling queues and the plurality of interrupt queues each consists of a same number of queues.

17. The computer-implemented system according to claim 15 wherein the one or more operations further comprise:
testing storage performance of a plurality of ratios by performing a plurality of I/O commands with mixed block sizes;
determining the threshold ratio from the plurality of possible ratios based on the storage performance.

18. The computer-implemented system according to claim 15, wherein the transport driver layer exposes at least one of the total number of the plurality of polling queues or the total number of the plurality of interrupt queues to the core layer.

19. The computer-implemented system according to claim 15, wherein the storage stack further comprises at least one of a filesystem device switch (FDS) layer, a pluggable storage architecture (PSA) layer, or a devices layer.

20. The computer-implemented system according to claim 15, wherein the first threshold size is equal to the second threshold size.

\* \* \* \* \*